UNITED STATES PATENT OFFICE.

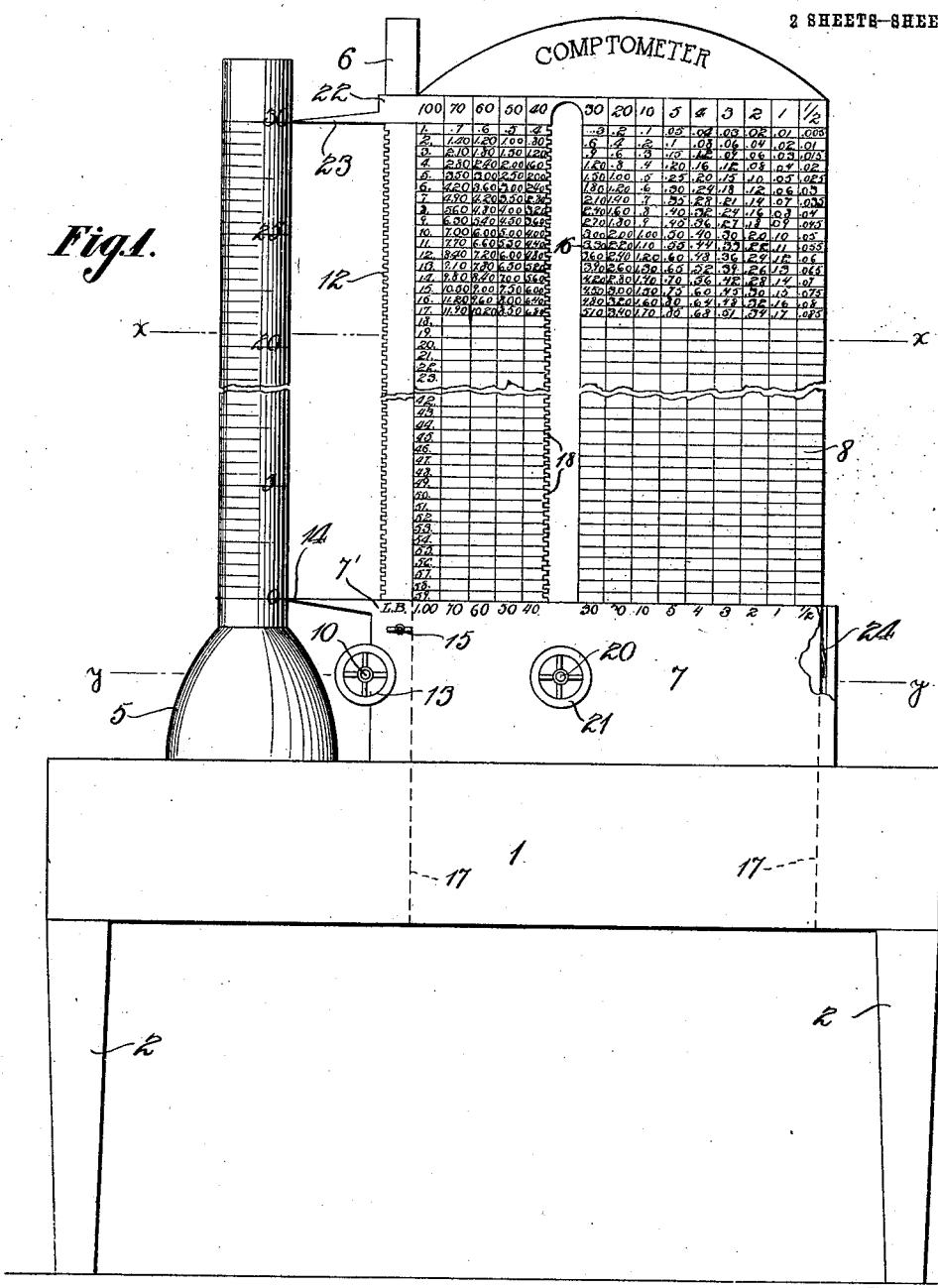

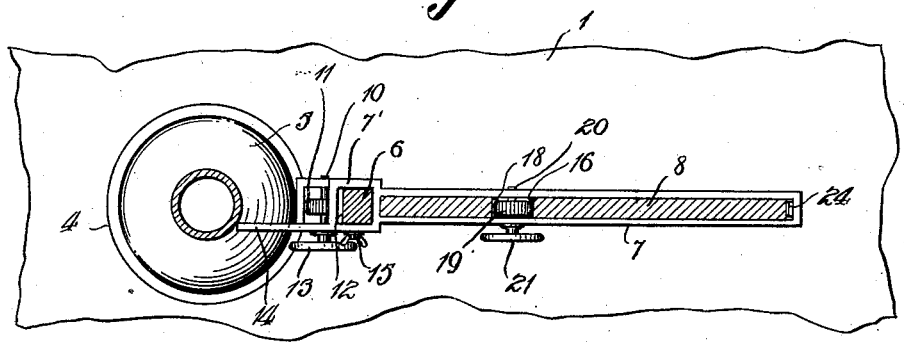
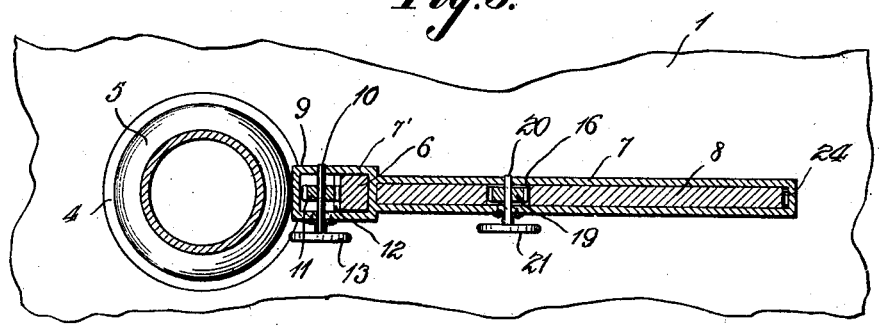
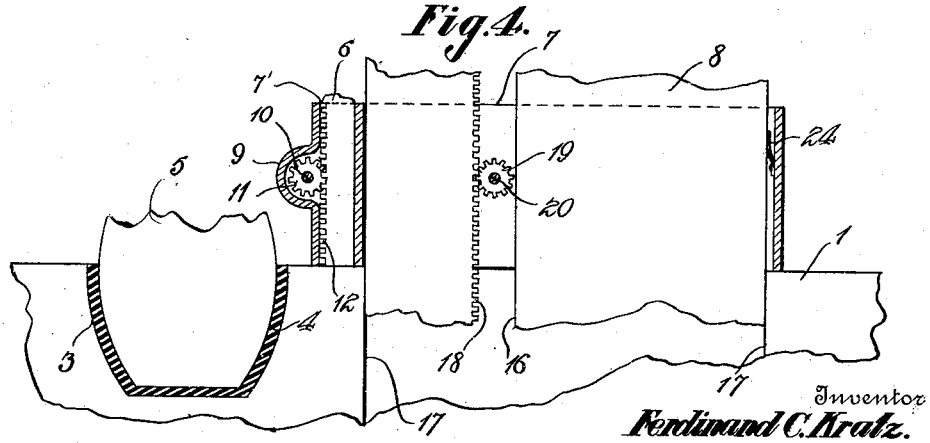

FERDINAND C. KRATZ, OF OLIVET, SOUTH DAKOTA.

CREAM-TESTING DEVICE.

979,009.  Specification of Letters Patent. Patented Dec. 20, 1910.

Application filed May 6, 1910. Serial No. 559,808.

*To all whom it may concern:*

Be it known that I, FERDINAND C. KRATZ, a citizen of the United States, residing at Olivet, in the county of Hutchinson and State of South Dakota, have invented certain new and useful Improvements in Cream-Testing Devices, of which the following is a specification.

This invention relates to improvements in cream testing devices, and more particularly to those capable of adjustment in respect to a standard graduated test bottle for containing milk.

The object of this invention is to provide a testing device with a calculating scale board consisting of a graduation of lines and figures properly arranged and calculated.

Another object of the invention is to provide a very simple, practical and efficient device of the character above described, whereby the floating cream or butter fat on a given amount of milk may be accurately and subsequently calculated to ascertain its exact percentage as to grade and value, thus obviating the many mistakes heretofore experienced in properly figuring to obtain the above results.

A further object of the invention is to provide the device with calipers or pointers capable of easy adjustment in relation to one another and adapted to be held in their proper position in respect to one another and the calculating scale board forming a part of the device, whereby the pointers may be moved on a line with the upper and lower levels of the floating butter fat or cream contained within the graduated test bottle, the latter primarily receiving the milk to be tested.

Other objects and advantages will be apparent from the following description, and it will be understood that changes in the specific structure shown and described may be made within the scope of the claims without departing from the spirit of the invention.

In the drawings: Figure 1 is a front elevation of the complete invention showing the parts in a normal position, Fig. 2 is a cross section taken on the line X—X of Fig. 1, Fig. 3 is a similar section taken on the line Y—Y of Fig. 1, Fig. 4 is a fragmentary sectional view taken vertically through the longitudinal portion of the table or support.

Referring to the drawings 1 represents a stand or table of suitable dimensions preferably rectangular in shape and supported upon legs 2 for properly elevating said table for the purposes hereinafter described.

Formed in the top of the table 1 is a receiving socket 3 having a line of rubber or other pliable material 4 which yieldingly receives the bottom or lower portion of the graduated test bottle 5, the latter being of standard make and design and is properly held in an upright position by the construction of the socket referred to.

Fixed to the table 1 adjacent to the graduated test bottle 5 and arranged in an upright position is a guide bar 6 which preferably extends above the upper end of said bottle, and movable upon the bar is an indicating board 7 which is provided with a looped portion 7' which freely receives the guide bar 6 and is adapted to be adjusted thereon. The indicator board 7 is box shaped throughout its length providing an elongated passage through which the graduated scale board 8 is adapted to be freely moved for properly adjusting the parts in respect to one another. The lower edge of the indicator board 7 normally rests upon the upper surface of the table 1 and is provided with a casing 9 located to one side thereof within which is journaled a short shaft 10 to which a gear wheel or pinion 11 is fixed, the latter meshing with a rack 12 secured to or otherwise formed upon one edge of the vertical supporting guide bar 6, the outer projecting end of the shaft 10 having an operating knob 13 which is adapted to be grasped for properly adjusting the indicator board 7 upon said support 6. Projecting from one end of the indicator board 7 is a pointer 14 which is adapted to be moved along the graduated portion of the test bottle, and passing through said board about its looped portion is a binding screw 15 which is adapted to come in contact with the vertical support 6, for holding said indicator board in a binding position upon said support after the same has been properly adjusted.

The graduated scale board 8 is of suitable size and dimensions and freely passes through the housing of the indicator board 7 and a correspondingly shaped or elongated opening 17 formed in the table 1 immediately below said housing, whereby the scale board is in a position to be freely moved through the housing of the indicator board and opening formed in the table for properly adjusting the scale board in a vertical position. The graduated scale board 8 is provided with a vertical slot 16 of a length to extend entirely along the board about the graduated scale portion thereof, and secured to one edge of said slotted portion of the board is a rack bar 18 which meshes with a pinion 19 mounted upon a shaft 20 journaled in the opposite side walls of the indicator board 7, said pinion being arranged to freely turn within the slot 16 of the graduated scale board 8, said shaft also having an operating knob 21 for adjusting the scale board independently of the indicator board.

Secured to the upper end of the scale board 8 and projecting from one edge thereof is a loop 22 which freely embraces the supporting guide post 6 whereby the upper end of said board is held in a sliding position upon the support, the lower portion of the board being properly housed and guided by the elongated boxing of the indicator board. Projecting from the looped portion 22 of the graduated scale board is a pointer 23 which is adapted to be adjusted along the graduated portion of the bottle 5 when the knob 21 is turned in either direction.

Secured to one of the end walls of the indicator board 7 and located within the box receiving portion of the board is a flat spring 24 the free end of which is in yielding contact with the adjacent edge of the scale board 8, whereby when the boards 7 and 8 are properly adjusted in respect to one another the upper edge of the indicator board 7 will always remain on a perfect line with the lines on the graduated scale board thus preventing mistakes that might otherwise occur in reading the figures arranged along a certain line.

In practice the milk to be tested is placed in the standard graduated bottle 3 and allowed to stand undisturbed for a given time and when it is desired to test the cream or butter fat the indicator board 7 is elevated the required distance upon the supporting post 6 by turning the operating knob 15 until the pointer 14 is brought to a line with the lower level of the cream after which the binding screw 15 is adjusted to hold the indicator board in set position. After the indicator board has been properly adjusted and rigidly secured the operating knob 21 is turned in the proper direction to adjust the graduated scale board 8 in such a position as to bring the pointer 23 carried thereby on a line with the upper level of the cream or butter fat contained within the bottle. The first row of figures of the graduated scale board beginning with 100 are intended to designate the number of pounds of cream bought for example, if 60 pounds of cream is purchased and test shows 17 per cent., then under column marked 60 on the indicator board 7 and opposite 17 on the scale board, 10 20/100 pounds will be found the amount of butter fat in 60 pounds of cream to be paid for.

As clearly shown in Fig. 1 of the drawings the graduated scale board 8 is of sufficient width to accommodate the figures in rotation beginning with 100, 70, 60, 50 etc., and the operation of the device and the remaining figures carried out in a manner shown all of which will be clearly obvious from the foregoing description.

The device as constructed is intended to be portable and the parts may be readily detached and packed for easy shipment and ready handling, however I do not limit myself to the detachable features as it is evident that the device may be permanently fixed in a position for ready access.

What is claimed is:

1. In combination with a standard graduated bottle for receiving the milk to be tested, of an indicator board having a pointer adjustable along the scale portion of the bottle, a graduated scale board also having a pointer adjustable along the graduated portion of the bottle, and means for raising and lowering said scale board, whereby the same is adjustable in relation to the indicator board.

2. In a cream testing device, a suitable support, a guide bar fixed to the same and projecting outwardly therefrom, an indicator board box shaped along its length, a pointer forming part of said board, a graduated scale board adjustable upon said guide bar, a pointer forming a part of the scale board, the latter having a slot extending throughout the greater portion of its length, a rack bar fixed to the scale board within the slot, a pinion carried by the indicator board and located within the slot of the scale board and meshing with the rack bar, means for rotating said pinion, a second pinion also carried by the indicator board, a rack secured to the guide bar with which the said pinion meshes, and means for operating the last named pinion, said boards being each provided with pointers to be adjusted in a proper position in respect to the scale portion of a testing bottle whereby the floating cream or butter fat may be accurately measured.

3. In combination with a standard graduated testing bottle; of a base for removably holding the bottle in a vertical position, a supporting guide post fixed to said base and projecting upwardly therefrom, an indicator board provided with a looped portion embracing said post, the remaining portion of the board being box shaped, a casing carried by the indicator board at one end thereof, a shaft journaled in said casing, an operating knob fixed to one end of the shaft, a pinion also fixed to the shaft, a rack bar secured to one end of the post with which the pinion meshes, a binding screw carried by the board the end of which is adapted to be brought in contact with the post, a graduated scale board having graduated lines and figures properly arranged thereon, said figures being accurately calculated, said graduated scale board being provided with a loop extension located adjacent to its upper end and adapted to embrace said post, a flat spring secured to the inner surface of the one end of the housing forming the indicator board, the free end of which spring is in yielding contact with the adjacent edge of the graduated scale board, the latter having a slot extending along its length, a rack bar secured to one edge of the slotted portion of the scale board, a pinion mounted within the housing of the indicator board and meshing with the rack bar of the scale board, a shaft journaled in the opposite side of the indicator board to which the pinion is attached, an operating rod secured to said shaft, and pointers secured to said boards for registry with the graduated portion of the test bottle, said graduated scale board passing freely through the housing of the indicator board and through an elongated opening formed in the base, whereby said boards are adjustable upon the post in relation to one another but in close proximity for properly measuring the cream contained within the bottle and ascertaining its exact percentage as to grade and value.

In testimony whereof I affix my signature, in presence of two witnesses.

FERDINAND C. KRATZ.

Witnesses:
  E. W. AISENBREY,
  JACOB A. METTLER.